Sept. 17, 1929.  E. R. SHAW  1,728,771
LIQUID DISPENSING STATION
Filed April 12, 1928
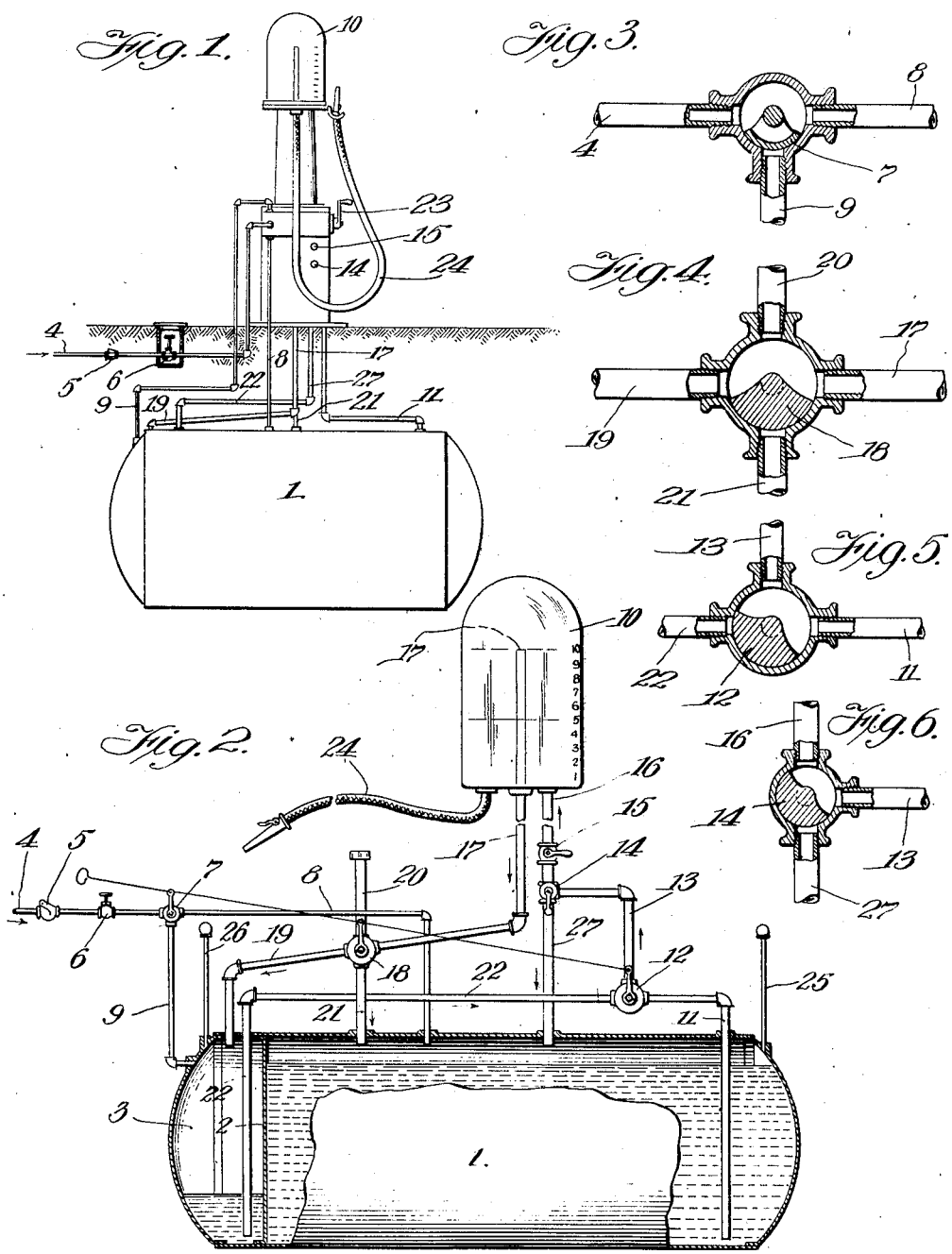
Inventor:
Elwyn R. Shaw.
By Rummler Rummler,
Attys.

Patented Sept. 17, 1929

1,728,771

UNITED STATES PATENT OFFICE

ELWYN R. SHAW, OF FREEPORT, ILLINOIS

LIQUID-DISPENSING STATION

Application filed April 12, 1928. Serial No. 269,518.

This invention relates to liquid measuring and dispensing apparatus.

The main objects of this invention are to provide a motor fuel measuring and dispensing apparatus which is operated entirely by the pressure of air in other compressible gas; to provide a dispensing apparatus in which all of the usual pumps and manually operated mechanisms are eliminated; and to provide a generally simplified apparatus which can be maintained over a long period of time at a minimum expense and with a minimum of replacement of parts.

An illustrative embodiment of this invention is shown in the accompanying drawings in which:

Figure 1 is a view in elevation of a complete installation of the dispensing apparatus designed for dispensing motor fuel and giving a general idea of the external appearance of the same.

Fig. 2 is a diagrammatic view of the piping and control valves shown in separated relation to one another, in order to more clearly show the operation of the system.

Fig. 3 is a sectional detail of valve 7.

Fig. 4 is a sectional detail of valve 18.

Fig. 5 is a sectional detail of valve 12.

Fig. 6 is a sectional detail of valve 14.

Heretofore in liquid measuring and dispensing apparatus, some installations have utilized valve and piston pumps for withdrawing the liquid from the storage tank and have dispensed the same either directly or through a visible service receptacle.

Other installations more recently in use have utilized the air-lift principles to some extent for the purpose of withdrawing the liquid from the storage tank but all such constructions have been objectionable on account of the mechanism, check valves, intermediate pumps and controls, electrical switches and devices, etc., necessary for accomplishing the desired purpose.

At the present time the trend is to have dispensing apparatus which is provided with a glass service tank with units of measurement calibrated thereon and usually of ten gallon capacity for gasoline and the like wherein the liquid to be sold to the consumer is visible to him. In the operation of such a type of dispensing apparatus, it is necessary for the glass service tank to have an overflow pipe extending upward therein so that the tank can be filled to a point above the highest unit of measurement calibrated thereon and the overflow pipe thereupon automatically draws off the liquid at the exact height to register with the scale provided to show the capacity of the service tank. An overflow reservoir, vented, and not under pressure, for this overflow pipe is therefore necessary, which must be independent of the reservoir that is then under pressure. Another requirement of this type of apparatus, therefore, necessarily follows and that is means have to be provided for emptying the overflow reservoir at suitable intervals either by dispensing out of this overflow reservoir, or by transferring the liquid back to the supply tank from which it was drawn.

In my improved construction herein shown and described, I provide a supply reservoir and an air overflow reservoir, the functions of which may be reversed, the supply becoming the overflow and the overflow becoming the supply, by changing the positions of the valves 7, 18 and 12, as hereinafter explained, with suitable compressed air pipe connections thereto, so that air or gas pressure may be maintained at will in either of said reservoirs. Other suitable pipe connections are provided for transferring the liquid from the overflow reservoir to the main supply reservoir, or to the service reservoir, and from the main supply reservoir to the service reservoir, from which the liquid is dispensed to the customer.

Suitable connections are also provided for draining the liquid from the service reservoir back to the supply reservoir when the apparatus is to be closed for the night, or discontinued for any length of time.

In the construction shown in the drawings, a supply reservoir 1 is shown in the form of an elongated cylindrical tank. Adjacent one end of the tank is an air-tight partition wall 2 which divides off an overflow or auxiliary supply reservoir 3 which is shown as being of about ten per cent of the capacity of the supply reservoir 1, but which may be any other size or shape, or an entirely separate tank or air-tight receptacle.

Means are provided for supplying air under pressure to the reservoirs 1 and 3 and comprise an air pipe line 4 communicating with any suitable source of air under pressure (not shown). The line 4 passes through an automatic air-reducing valve 5 and thence to a control valve 6 which may be designed so that it can be locked at night or at any time when it is desired to close the dispensing apparatus. From the valve 6 the air line passes to a two-way control valve 7, from which leads a pipe 8 which communicates with the supply reservoir 1, and a pipe 9 which communicates with the overflow supply reservoir 3. Valve 7 is so designed and attached to the pipes that when communication is established between pipes 4 and 8 it is closed between pipes 4 and 9, and likewise so that when communication is established between pipes 4 and 9 it will be closed between pipes 4 and 8. This valve is always open to pipe 4, and either pipe 8 or 9 but never to both at the same time.

Means are provided for conducting the liquid from supply reservoir 1 to a service reservoir 10 and comprise a pipe 11 which extends down into the reservoir 1 closely adjacent the bottom thereof. The pipe 11 communicates with a two-way valve 12, pipe 13, another two-way valve 14, a service valve 15, and pipe 16 which communicates with the service reservoir 10. With the valve 7, 18, 12 and 14 properly set and the valve 15 open, air pressure introduced into the reservoir 1 causes the liquid to flow up into the pipes 11, 13 and 16, into the service reservoir 10.

An overflow pipe 17, the top end of which extends up level with the highest calibration mark on the service reservoir 10, communicates normally through a four-way valve 18 and pipe 19 with the overflow reservoir 3 and at the same time vents the reservoir 3 to the atmosphere through a filler pipe 20. The valve 18 is arranged also to close communication between the pipes 17 and 19 and establish communication between the air vent and filler pipe 20 and a pipe 21 which communicates with the reservoir 1. This valve 18 is so designed and attached to the pipes that when communication is established between pipes 17 and 21 it is closed between 17 and 19, and when communication is established between pipes 17 and 19 it is closed between 17 and 21, it being in both positions open to filler-pipe vent 20, and overflow pipe 17, and either pipe 19 or pipe 21, but never to both at the same time.

The valve 12 is so arranged that when turned to a proper position, it will close communication between the pipes 13 and 11 and establish communication between the pipe 13 and a pipe 22 which extends into the overflow reservoir, the lower end thereof being closely adjacent the bottom of said reservoir. Valve 12 is also so arranged that when communication is closed between pipes 11 and 13 it will be open between 22 and 13, it being always open into pipe 13 from 11 or 22, but never from both at the same time.

It will be understood that in the practical embodiment of this invention, the valves 7, 18 and 12 may conveniently all be collected into a unitary assembly operated by a single control 23, as indicated in Fig. 1 of the drawings. The service reservoir 10 is, of course, provided with a hose 24 or other outlet, suitably valved through which the liquid is dispensed.

The reservoirs 1 and 3 are provided with safety valves 25 and 26 respectively for limiting the amount of pressure introduced into or accumulated in either of the said reservoirs.

In the operation of this dispensing apparatus it will be assumed that the pipe 4 is connected to a suitable source of air or other gas under pressure sufficient to lift the liquid in the reservoir to the height of the top of dispensing reservoir 10 and the valve 6 opened. The valve 7 is positioned so as to provide communication through the pipe 8 from the source of air pressure to the supply reservoir 1 and close communication through the pipe 9 to the reservoir 3, thus putting the liquid in reservoir 1 under pressure. The valve 12 is positioned so as to close communication through the pipes 22 and 13 and establish communication between the pipe 11 and pipe 13. The valve 14 is positioned so as to establish communication through the pipe 13 to the pipe 16, and close communication to the pipe 27.

The valve 18 is positioned so as to close communication to the pipe 21 and establish communication between pipes 17 and 19, and vented to the atmosphere through the filler pipe 20.

While the valves are thus positioned the reservoir 3 may be filled by pouring liquid into the pipe 20.

Valves 7, 18, 12 and 14 being thus positioned, the valve 15 is opened and the air pressure in reservoir 1 causes the liquid to pass up through the pipes 11, 13 and 16 into the service reservoir 10 to a point slightly above the top end of the overflow pipe 17, at which time valve 15 is closed. The excess liquid in the service reservoir 10 drains down the overflow pipe 17 through pipe 19 into reservoir 3.

With the main control valves 7, 18 and 12 remaining in the positions last described, it will be seen that all that is necessary to fill the supply reservoir 10 from time to time is to open the valve 15.

If the operator desires to transfer the liquid from reservoir 3 to reservoir 1, it may be done as follows:

The valve 7 is turned to cut off communication to the pipe 8 and establish communication through the pipe 9 so as to place air pressure on the liquid in reservoir 3. At the same time, the valve 18 is positioned to close the pipe 19 and establish communication between the pipes 17, 20 and 21, so as to vent reservoir 1. The valve 12 is positioned to establish communication between the pipes 22 and 13 and close communication through the pipe 11. The valve 14 is also positioned to provide communication between pipe 13 and the pipe 27 which leads to the reservoir 1. As soon as the valve 14 is thus positioned, the liquid in reservoir 3 passes up through the pipe 22 through valve 12, pipe 13, valve 14 and down pipe 27 into the reservoir 1. In this manner the liquid in reservoir 3 is quickly transferred to reservoir 1. At the same time, and with the same positioning of the valves, the air-shut-off valve 6 may be closed, valve 15 opened between valve 14 and receptacle 10, whereupon all the liquid in receptacle 10 will run down pipes 16 and 27 into reservoir 1, where it will remain inaccessible so long as valve 6 is kept closed, by lock or otherwise.

It will be further noted, that while the valves are thus positioned, but with the air-shut-off valve 6 open, dispensing may be carried on from reservoir 3, by changing the position of valve 14 so as to close communication with pipe 27 and establish communication between pipes 13 and 16. With the valves thus set, reservoir 3 becomes the supply reservoir and reservoir 1 becomes the overflow reservoir.

When it is desired to refill the supply reservoir 1, the valves 7, 18 and 12 are positioned in the same manner as when it is desired to transfer liquid from reservoir 3 to reservoir 1. The valve 14 need not be changed from its first stated position, that is to provide communication through the pipe 13 to the valve 15. With this positioning of the valves, the service reservoir 10 can be filled from reservoir 3, the liquid passing up through the pipe 22 to valve 12, pipe 13, valve 14, valve 15 and pipe 16. When the valve 18 is in such position, liquid coming down the overflow pipe 17 passes through the valve 18 and down pipe 21 into the main reservoir 1. While the valves are in this position the vent-filler pipe 20 has a free opening through valve 18 and pipe 21 into main reservoir 1 for refilling same, and while this operation is being carried on, dispensing can be carried on from reservoir 3.

When it is desired to close the apparatus for the night or any other period of time, the main air control valve 6 is closed and locked and the valves 7, 18 and 12 positioned to vent reservoir 1. Any liquid which may be in the service reservoir 10 may then be drained back into the main reservoir 1 by opening valves 15 and 14 so that the gasoline drains down pipe 16 and pipe 27 into reservoir 1.

It is thus seen that with this air pressure control of the apparatus, all pumps and like devices are eliminated and full and complete control of the entire dispensing system for all of the conditions necessary to the operation of such an apparatus may be had by the manipulation of the valves 7, 18, 12, 14 and 15, all of which except 14 and 15 are assembled in a unitary structure and operated by the one control handle 23.

Although but one specific embodiment of this invention has been herein shown and described, it will be understood that details of the construction shown may be altered or omitted without departing from the spirit of this invention as defined by the following claims.

I claim:

1. A dispensing apparatus of the class described, comprising a supply reservoir, an overflow supply reservoir, a service reservoir, means for placing either of said supply reservoirs under pressure, a valve and connections providing communication between said service reservoir and the supply reservoir under pressure, overflow means connecting said service reservoir with both of said supply reservoirs, and a valve for communicatively connecting the supply reservoir not under pressure with said overflow means.

2. A dispensing apparatus for handling liquids comprising a supply reservoir, an overflow supply reservoir, a service reservoir, a compressed air line communicating with each of said supply reservoirs, a valve on said air line for closing communication to one of said supply reservoirs and establishing communication to the other of said reservoirs, a liquid discharge line from each of said supply reservoirs communicating with said service reservoir, a valve on said liquid discharge line for closing communication with the supply reservoir not under pressure and establishing communication with the supply reservoir under pressure, a control valve on said liquid discharge line for filling said service reservoir, an overflow line providing communication between said service reservoir and each of said supply reservoirs, and a valve on said overflow line for establishing communication between said service reservoir and the supply reservoir not under pressure and closing communication to the supply reservoir under pressure.

3. A dispensing apparatus for handling liquids, comprising a supply reservoir, an overflow supply reservoir, a service reservoir, a compressed air line communicating with each of said supply reservoirs, a valve on said air line for closing communication to one of said supply reservoirs and establishing communication to the other of said reservoirs, a liquid discharge line from each of said supply reservoirs communicating with said service reservoir, a valve on said liquid discharge line cooperating with said air line valve for closing communication with the supply reservoir not under pressure and establishing communication with the supply reservoir under pressure, a control valve on said liquid discharge line for filling said service reservoir, an overflow line providing communication between said service reservoir and each of said supply reservoirs, and a valve on said overflow line cooperating with said air line and liquid discharge line valves for establishing communication between said service reservoir and the supply reservoir not under pressure and closing communication to the supply reservoir under pressure.

4. A liquid dispensing and measuring apparatus comprising a supply reservoir, an overflow supply reservoir, a service reservoir, a compressed air line communicating with each of said supply reservoirs, a valve on said air line for closing communication to one of said supply reservoirs and establishing communication to the other of said reservoirs, a liquid discharge line from each of said supply reservoirs communicating with said service reservoir, a valve on said liquid discharge line cooperating with said air line valve for closing communication with the supply reservoir not under pressure and establishing communication with the supply reservoir under pressure, a control valve on said discharge line for filling said service reservoir, an overflow line providing communication between said service reservoir and each of said supply reservoirs, and a valve on said overflow line cooperating with said air line and liquid discharge line valves for establishing communication between said service reservoir and the supply reservoir not under pressure and closing communication to the supply reservoir under pressure, said overflow line valve being adapted to vent the supply reservoir not under pressure.

5. A liquid dispensing and measuring apparatus comprising a supply reservoir, an overflow supply reservoir, a service reservoir, a compressed air line communicating with each of said supply reservoirs, a valve on said air line for closing communication to one of said supply reservoirs and establishing communication to the other of said reservoirs, a liquid discharge line from each of said supply reservoirs communicating with said service reservoir, a valve on said liquid discharge line cooperating with said air line valve for closing communication with the supply reservoir not under pressure and establishing communication with the supply reservoir under pressure, a control valve on said discharge line for filling said service reservoir, an overflow line providing communication between said service reservoir and each of said supply reservoirs, and a valve on said overflow line cooperating with said air line and liquid discharge line valves for establishing communication between said service reservoir and the supply reservoir not under pressure and closing communication to the supply reservoir under pressure, said overflow line valve being adapted to vent the supply reservoir not under pressure.

6. An apparatus for handling, measuring and dispensing liquid, comprising two air tight supply reservoirs, a pipe for supplying air under pressure to each of said reservoirs, a valve on said pipe for closing communication to one of said supply reservoirs and at the same time establishing communication to the other of said reservoirs, an elevated service reservoir located and equipped for dispensing liquid by gravity, a liquid discharge line from each of said supply reservoirs communicating with said service reservoir, a valve on said liquid discharge line for closing communication with the supply reservoir not under pressure and at the same time establishing communication with the supply reservoir under pressure, a control valve on said liquid discharge line between said last named valve and said service reservoir, an overflow pipe providing communication between said service reservoir and each of said supply reservoirs, a valve on said overflow pipe for establishing communication between said service reservoir and whichever of said supply reservoirs is not then under pressure and at the same time closing communication between said supply reservoir then under pressure and said service reservoir, a pipe connected with said overflow line through said last mentioned valve and adapted to vent whichever of said supply reservoirs is not then under pressure, and provide means of filling whichever of said supply reservoirs is not then under pressure.

7. A liquid dispensing and measuring apparatus comprising a supply reservoir, an overflow supply reservoir, a service reservoir, a compressed air line communicating with each of said supply reservoirs, a valve on said air line for closing communication to one of said supply reservoirs and establishing communication to the other of said reservoirs, a liquid discharge line from each of said supply reservoirs communicating with said service reservoir, a valve on said liquid discharge line cooperating with said air line valve for closing communication with the supply reservoir not under pressure and establishing communication with the supply reservoir under pressure, a control valve on said discharge line for filling said service reservoir, an overflow line providing communication between said service reservoir and each of said supply reservoirs, a valve on said overflow line cooperating with said air line and liquid discharge line valves for establishing communication between said service reservoir and the supply reservoir not under pressure and closing communication to the supply reservoir under pressure, said overflow line valve being adapted to vent the supply reservoir not under pressure, and a unified control for simultaneously setting the valves on said air line, said liquid discharge line and said overflow line to fill said service reservoir from either supply reservoir.

8. In a dispensing device of the class described, a pair of supply reservoirs, a dispensing reservoir, means connected with said supply reservoirs for alternatively conveying liquid from either one thereof to said dispensing reservoir, and overflow means connected with said supply reservoirs for returning the overflow from said dispensing reservoir to the other supply reservoir.

9. In a dispensing device of the class described, a pair of supply reservoirs, a dispensing reservoir, an air line connected with both of said supply reservoirs and comprising a valve for selectively placing either one thereof under pressure, and means connected with said supply reservoirs for alternatively conveying liquid from either one thereof to said dispensing reservoir and comprising a valve cooperatively associated with said air line valve for effecting communication between said dispensing reservoir and the supply reservoir not under pressure.

10. In a dispensing device of the class described, a pair of supply reservoirs, a dispensing reservoir, an air line connected with both of said supply reservoirs and comprising a valve for selectively placing either one thereof under pressure, means connected with said supply reservoirs for alternatively conveying liquid from either one thereof to said dispensing reservoir and comprising a valve associated with said air line valve for effecting communication between said dispensing reservoir and the supply reservoir under pressure, and overflow means connecting the dispensing reservoir with both of said supply reservoirs and comprising a valve cooperatively associated with said first-mentioned valves for effecting communication between said dispensing reservoir and the supply reservoir not under pressure.

Signed at Freeport, Illinois, this 9th day of April, 1928.

ELWYN R. SHAW.